(12) United States Patent
Helmy (10) Patent No.: US 10,848,443 B2
(45) Date of Patent: Nov. 24, 2020

(54) CHATBOT SOCIALIZATION (71) Applicant: AVAYA INC., Santa Clara, CA (US)

(72) Inventor: Ahmed Helmy, Dubai (AE)

(73) Assignee: Avaya Inc., Santa Clara, CA (US)

( * ) Notice: Subject to any disclaimer, the term of this patent is extended or adjusted under 35 U.S.C. 154(b) by 22 days.

(21) Appl. No.: 16/042,075

(22) Filed: Jul. 23, 2018

(65) Prior Publication Data
US 2020/0028803 A1  Jan. 23, 2020

(51) Int. Cl.
| G10L 15/22 | (2006.01) |
| H04L 12/58 | (2006.01) |
| G06F 9/451 | (2018.01) |
| H04M 3/51 | (2006.01) |
| G06N 20/00 | (2019.01) |

(52) U.S. Cl.
CPC .............. *H04L 51/02* (2013.01); *G06F 9/453* (2018.02); *G06N 20/00* (2019.01); *H04M 3/5191* (2013.01)

(58) Field of Classification Search
CPC .................................. G10L 15/22; H04L 51/02
See application file for complete search history.

(56) References Cited

U.S. PATENT DOCUMENTS

| 9,369,410 | B2 | 6/2016 | Capper et al. | |
| 2004/0225650 | A1* | 11/2004 | Cooper | H04M 3/527 |
| 2005/0177376 | A1* | 8/2005 | Cooper | G10L 15/065 |
| | | | | 704/277 |
| 2013/0013713 | A1 | 1/2013 | Shoham | |
| 2014/0129651 | A1* | 5/2014 | Gelfenbeyn | H04L 51/32 |
| | | | | 709/206 |
| 2014/0164508 | A1* | 6/2014 | Lynch | H04L 29/08081 |
| | | | | 709/204 |
| 2014/0244712 | A1* | 8/2014 | Walters | H04L 67/10 |
| | | | | 709/202 |
| 2014/0278605 | A1* | 9/2014 | Borucki | G06Q 30/0617 |
| | | | | 705/5 |

(Continued)

OTHER PUBLICATIONS

Puri "Bots &; Botnet: An Overview," SANS Institute, 2003, 18 pp. [retrieved online from: www.sans.org/reading-room/whitepapers/malicious/bots-botnet-overview-1299].

(Continued)

*Primary Examiner* — Jialong He
(74) *Attorney, Agent, or Firm* — Sheridan Ross P.C.

(57) ABSTRACT

Embodiments of the disclosure provide systems and methods for utilizing chatbots to support interactions with human users and more particularly to using multiple chatbots from different communication channels and/or in different domains to support an interaction with a user on a single communication channel and/or in a single domain. Generally speaking, embodiments of the present disclosure are directed to allowing multiple chatbots that operate on different communication channels and/or in different domains to socialize amongst one another. This socialization of chatbots operating on different communication channels and/or in different domains allows each chatbot to call upon one another to help engage in a transaction with a customer. In addition to facilitating a communication session in which two or more chatbots are socialized together to help prepare coherent responses to user inputs, the socialization of chatbots can also facilitate the automated training of chatbots.

15 Claims, 3 Drawing Sheets (56) References Cited

U.S. PATENT DOCUMENTS

| | | | | |
|---|---|---|---|---|
| 2015/0161997 A1* | 6/2015 | Wetsel | ............... | G06F 3/167 |
| | | | | 704/275 |
| 2015/0172463 A1* | 6/2015 | Quast | ............ | H04M 3/4936 |
| | | | | 379/88.01 |
| 2015/0186154 A1* | 7/2015 | Brown | ............ | G06F 3/04817 |
| | | | | 715/706 |
| 2015/0215350 A1* | 7/2015 | Slayton | ............... | G06F 9/453 |
| | | | | 709/204 |
| 2016/0205202 A1* | 7/2016 | Jia | ...................... | G06Q 30/04 |
| | | | | 705/40 |
| 2016/0308799 A1* | 10/2016 | Schubert | ............ | H04L 51/046 |
| 2017/0041183 A1* | 2/2017 | Hadad Segev | ....... | G06Q 10/06 |
| 2018/0096072 A1* | 4/2018 | He | ................... | G06F 3/0481 |
| 2018/0341644 A1* | 11/2018 | Retkowski | ......... | G06F 17/279 |

OTHER PUBLICATIONS

Sabanal "Thingbots: The Future of Botnets in the Internet of Things," SecurityIntelligence, Feb. 20, 2016, 3 pages [retrieved online from: securityintelligence.com/thingbots-the-future-of-botnets-in-the-internet-of-things/].

* cited by examiner

CHATBOT SOCIALIZATION

FIELD OF THE DISCLOSURE

Embodiments of the present disclosure relate generally to methods and systems for utilizing chatbots to support interactions with human users and more particularly to socialization of chatbots from different communication channels and/or in different domains to support an interaction with a user on a single communication channel and/or in a single domain.

BACKGROUND

A chatbot, also known as a talkbot, chatterbot, bot, Instant Messaging (IM) bot, interactive agent, or artificial conversational entity, is a computer program which conducts a conversation via auditory or textual interactions, typically with a human user. Such programs are often designed to convincingly simulate how a human would behave as a conversational partner, thereby passing the Turing test. Chatbots are typically used in dialog systems for various practical purposes including customer service or information acquisition. Some chatbots use sophisticated natural language processing systems, but many simpler systems scan for keywords within the input, then pull a reply with the most matching keywords, or the most similar wording pattern, from a database.

Chatbots can be relatively simple and operate in a talk, reply, talk, reply pattern, whereas more sophisticated chatbots can be programmed to have conversations in a more natural way. A significant problem with the use of most chatbots is the time it takes to program a workable chatbot. Most automated chatbots are either trained by manual inputs or trained based on inputs from a common channel. For instance, an online gaming chatbot is usually trained based on inputs/outputs of other online gaming chatbots. Similarly, social media chatbots are usually trained based on interactions from other social media channels. As a result, highly trained and specialized chatbots can be developed. However, these chatbots can become too specialized and narrowly focused on a particular channel or for a particular domain. As a result, they may not be good at handling communications outside of their relatively narrow channel or domain. Hence, there is a need for improved methods and systems for utilizing and training chatbots across channels and/or domains.

BRIEF SUMMARY

Embodiments of the disclosure provide systems and methods for utilizing chatbots to support interactions with human users and more particularly to using multiple chatbots from different communication channels and/or in different domains to support an interaction with a user on a single communication channel and/or in a single domain. Generally speaking, embodiments of the present disclosure are directed to allowing multiple chatbots that operate on different communication channels and/or in different domains to socialize amongst one another. This socialization of chatbots operating on different communication channels and/or in different domains allows each chatbot to call upon one another to help engage in a transaction with a customer. In addition to facilitating a communication session in which two or more chatbots are socialized together to help prepare coherent responses to user inputs, the socialization of chatbots can also facilitate the automated training of chatbots. Specifically, chatbots used on one type of communication channel, e.g., video, co-browsing, voice, chat, email, etc., and/or in one type of domain, e.g., healthcare, hospitality, consumer product support, etc., may be trained using knowledge of chatbots that operate on other types of communication channels and/or in other domains.

According to one embodiment, a method for using multiple chatbots to support a communication session can comprise receiving, by a recommendation engine executing on a server, a request for assistance from a first chatbot conducting a communication session with a user and selecting, by the recommendation engine executing on the server, a second chatbot from a plurality of chatbots. The second chatbot can be operating on a different communication channel or in a different domain from the first chatbot. The request for assistance from the first chatbot can comprise a question or user input to which the first chatbot cannot respond with at least a predetermined amount of certainty.

Selecting the second chatbot can be based on the request specifically identifying the second chatbot. For example, the first chatbot can specifically request the second chatbot in the request for assistance based on previous use of one or more responses provided to the first chatbot by the second chatbot. Additionally, or alternatively, selecting the second chatbot can comprise determining a domain for the question or user input in the request for assistance from the first chatbot and selecting the second chatbot from the plurality of chatbots based on a set of records associating each chatbot of the plurality of chatbots with one or more domains.

In either case, the recommendation engine can direct the received request for assistance from the first chatbot to the selected second chatbot and monitor a response to the request for assistance generated by the second chatbot and sent to the first chatbot by the second chatbot. The response to the request for assistance generated by the second chatbot can comprise an answer to the question or interaction represented in the request for assistance and a confidence score for the answer. Monitoring the response to the request for assistance generated by the second chatbot can comprise receiving feedback from the first chatbot. The feedback can be based on a result for using the response to the request for assistance by the first chatbot in the communication session with the user. Additionally, or alternatively, monitoring the response to the request for assistance generated by the second chatbot can comprise updating the set of records associating each chatbot of the plurality of chatbots with one or more domains.

According to another embodiment, a method for conducting a communication session with a user can comprise receiving, by a first chatbot conducting the communication session with the user, a question or input from the user and determining, by the first chatbot, to request assistance from a second chatbot with responding to the question or input from the user. Determining to request assistance can be based on a certainty for a response to the question or input from the user generated by the first chatbot being less than a predetermined amount. In response to determining to request assistance from the second chatbot, the first chatbot can send a request for assistance message to a recommendation engine executing on a server. The request for assistance can comprise the question or input from the user. The first chatbot can receive, from the second chatbot, a proposed response to the question or input from the user, use the proposed response to the question or input received from the second chatbot in the communication session with the user, and monitoring a result of using the proposed response to the question or input received from the second chatbot in the communication session with the user. Based on monitoring the result of using the proposed response a set of information maintained by the first chatbot and related to the second chatbot can be updated or feedback based on the result of using the response in the communication session with the user can be provided to the recommendation engine.

According to yet another embodiment, a system can comprise a first chatbot comprising a processor and a memory coupled with and readable by the processor and storing therein a set of instruction which, when executed by the processor, can cause the processor to conduct a communication session with a user on a first communication channel or in a first domain, receive a question or input from the user during the communication session, determine to request assistance with responding to the question or input from the user, and in response to determining to request assistance, sending a request for assistance message comprising the question or input from the user.

A second chatbot can operate on a second communication channel or a second domain different from the first chatbot.

A server can comprise a processor and a memory coupled with and readable by the processor and storing therein a set of instruction which, when executed by the processor, can cause the processor to receive the request for assistance from the first chatbot, select the second chatbot from a plurality of chatbots, direct the received request for assistance from the first chatbot to the selected second chatbot, and monitor a response to the request for assistance generated by the second chatbot and sent to the first chatbot by the second chatbot.

The request for assistance from the first chatbot can comprise the question or user input and can be generated by the first chatbot in response to determining the first chatbot cannot respond with at least a predetermined amount of certainty. The response to the request for assistance generated by the second chatbot can comprise an answer to the question or interaction represented in the request for assistance and a confidence score for the answer.

Selecting the second chatbot can be based on the request specifically identifying the second chatbot. In such a case, the first chatbot can specifically request the second chatbot in the request for assistance based on previous use of one or more responses provided to the first chatbot by the second chatbot. In other cases, selecting the second chatbot can comprise determining a domain for the question or user input in the request for assistance from the first chatbot and selecting the second chatbot from the plurality of chatbots based on a set of records associating each chatbot of the plurality of chatbots with one or more domains.

Monitoring the response to the request for assistance generated by the second chatbot can comprise receiving feedback from the first chatbot. The feedback can be based on a result for using the response to the request for assistance by the first chatbot in the communication session with the user. Monitoring the response to the request for assistance generated by the second chatbot can further comprise updating the set of records associating each chatbot of the plurality of chatbots with one or more domains.

The first chatbot can receive, from the second chatbot, the proposed response to the question or input from the user, use the proposed response to the question or input received from the second chatbot in the communication session with the user, and monitor a result of using the proposed response to the question or input received from the second chatbot in the communication session with the user. In some cases, the first chatbot can update a set of information maintained by the first chatbot and related to the second chatbot. Additionally, or alternatively, the first chatbot can provide feedback based on the result of using the response to the request for assistance by the first chatbot in the communication session with the user.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670

K and i7-4770 K 22 nm Haswell, Intel® Core® i5-3570 K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for utilizing chatbots to support interactions with human users and more particularly to using multiple chatbots from different communication channels and/or in different domains to support an interaction with a user on a single communication channel and/or in a single domain. Generally speaking, embodiments of the present disclosure are directed to allowing multiple chatbots that operate on different communication channels and/or in different domains to socialize amongst one another. This socialization of chatbots operating on different communication channels and/or in different domains allows each chatbot to call upon one another to help engage in a transaction with a customer. In addition to facilitating a communication session in which two or more chatbots are socialized together to help prepare coherent responses to user inputs, the socialization of chatbots can also facilitate the automated training of chatbots. Specifically, chatbots used on one type of communication channel, e.g., video, co-browsing, voice, chat, email, etc., and/or in one type of domain, e.g., healthcare, hospitality, consumer product support, etc., may be trained using knowledge of chatbots that operate on other types of communication channels and/or in other domains.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
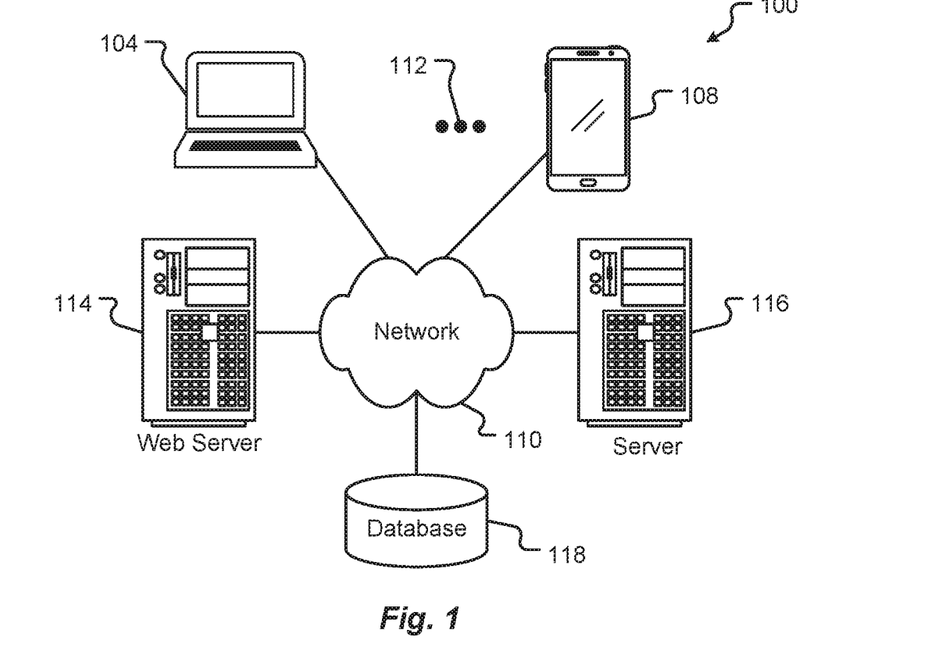
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® such as LINUX or other UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
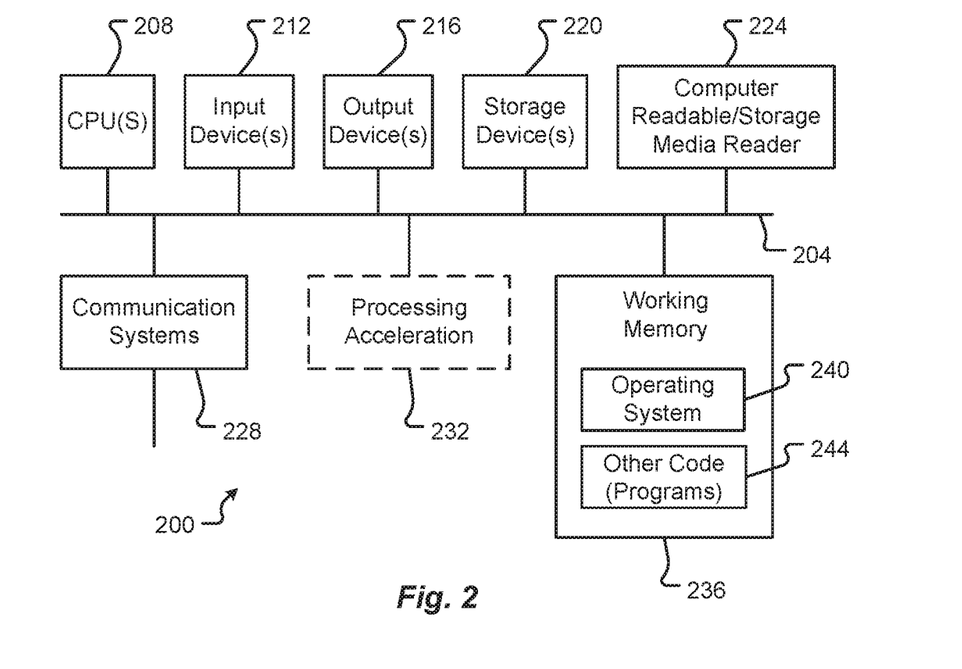
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670 K and i7-4770 K 22 nm Haswell, Intel® Core® i5-3570 K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
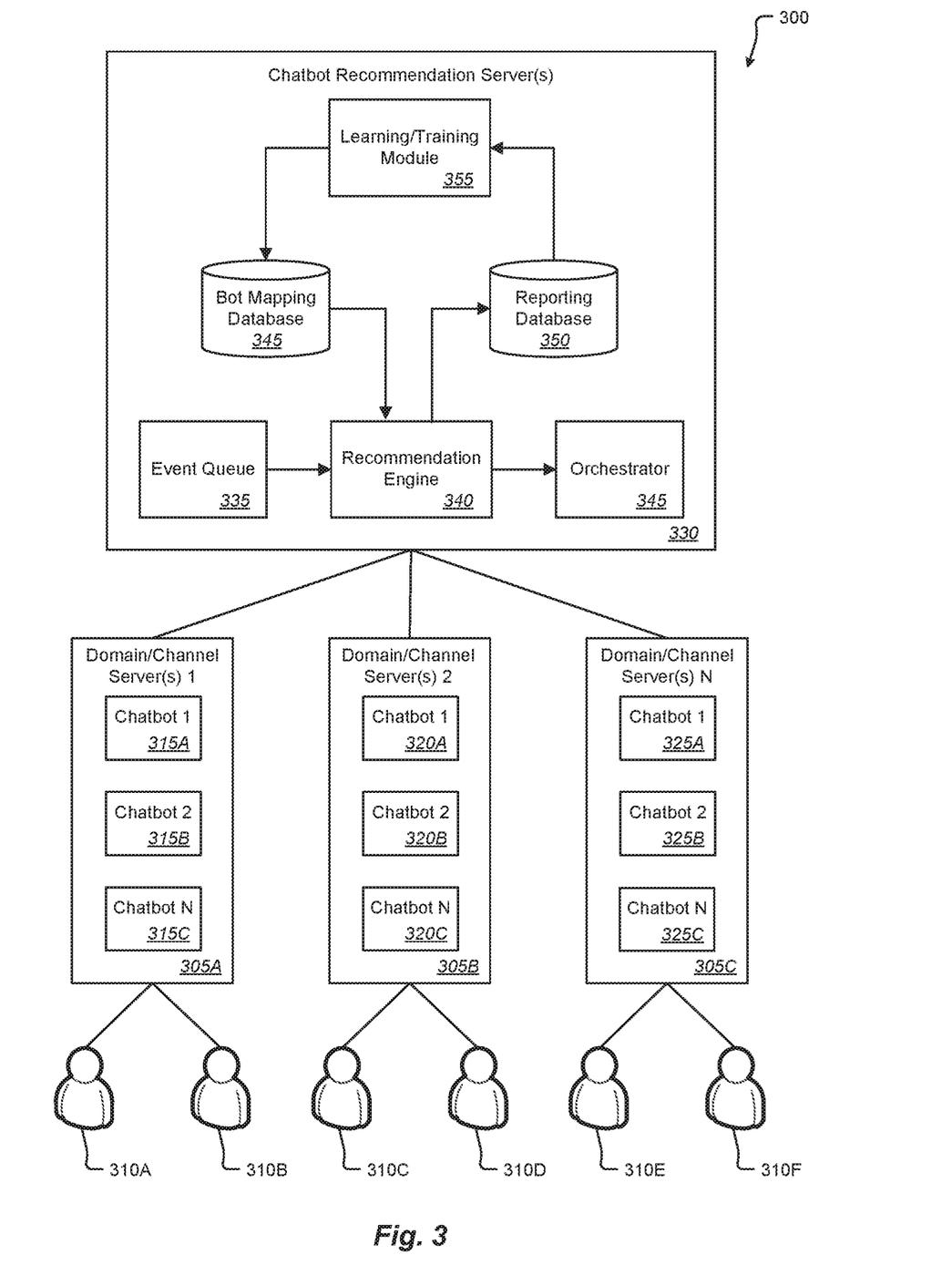
FIG. 3 is a block diagram illustrating elements of an exemplary system for socializing chatbots across channels and/or domains according to one embodiment of the present disclosure.

FIG. 3 is a block diagram illustrating elements of an exemplary system for socializing chatbots across channels and/or domains according to one embodiment of the present disclosure. As illustrated in this example, a system 300 can comprise one or more servers 305A-305C such as any of the servers described above. Generally speaking, the servers can provide one or more services to any number of users 310A-310F which communicate and interact with the servers 305A-305C via one or more communication networks (not shown here) such as described above. For example, one server 305A may comprise an online reservation system for an airline or car rental agency. Another server 305B may comprise a Customer Relationship Management (CRM) system providing customer service and support. Another server 305C may provide an online environment such as a social network and/or collaboration environment. It should be understood that, in some cases, any given server 305A-305C can provide more than one service and/or more than one type of service depending upon the implementation. Regardless of exactly how many or what types of servers and/or services are provided, each can represent a different domain. As used herein, a domain refers to a type of service, field of use, area of expertise, or a focus for the functions performed by the service.

Each server 305A-305C can execute one or more chatbots 315A-315C, 320A-320C, and 325A-325C to support communications with the users 310A-310F. For example, a server 305A providing an airline reservation system may execute a number of chatbots 315A-315C for conducting communications with users 310A-310B over different communication channels. These different channels can comprise, for example, an Instant Messaging (IM) channel, a voice channel, a Short Message Service (SMS) text message channel, and any number of other, similar communication channels. Each chatbot 315A-315C executed by the server 305A can be adapted to communicate on one of these channels, e.g., one chatbot 315A can comprise an IM chatbot while another chatbot 315B can comprise a voice chatbot, etc.

According to one embodiment, the chatbots 315A-315C, 320A-320C, and 325A-325C can be adapted to assist one another across channels and/or across domains. To facilitate this interaction, the system 300 can also include one or more chatbot recommendation servers 330. Generally speaking, the chatbot recommendation server 330 can receive requests for assistance from one chatbot 315A, e.g., when the chatbot has a low confidence score for answering a user question or communication, and can recommend another chatbot 315C on a different channel or even a different chatbot 320B in a different domain to provide a proposed answer to the user question or comment. In some cases, the recommendation server 330 can recommend more than one chatbot, e.g., both chatbot 315C on a different channel and chatbot 320B in a different domain, and the original requesting chatbot 315A, after receiving the proposed answers from each of these chatbots 315C and 320B, can select one of the proposed answers for use in the communication session with the user 310A. This answer may be selected based on a confidence score for the proposed answer provided by each recommended chatbot 315C and 320B.

For example, a user 310A may be navigating a web page and may elect to engage in a co-browsing session. Initially, the co-browsing session can be handled by a first type of chatbot 315C (i.e., a co-browsing chatbot) that provides both chat capabilities as well as co-browsing capabilities. As the co-browsing session continues, the first chatbot 315C may be presented with a question or user input to which the first chatbot 315C cannot respond with a predetermined amount of certainty. For example, the first chatbot 315C may have a response to the user input, but the first chatbot 315C may only have a 50% confidence that the response to the user input is appropriate. If the first chatbot 315C has this minimal confidence, the first chatbot 315C may "socialize" with a second chatbot 325A which may be more specialized and (possibly) more likely to prepare a response to the user input with a higher degree of confidence. When the second chatbot 325A is included in the conversation, e.g., by providing the user question or input to the second chatbot 325A, it may analyze the various interactions between the user 310A and first chatbot 315C to develop an understanding of the interaction history between the user 310A and first chatbot 315C. The second chatbot 325A may provide its proposed response to the first chatbot 315C along with its confidence index or score. If the response prepared by the second chatbot 325B is determined to have a higher confidence index than the first chatbot 315C, then either the first 315C or second chatbot 325B may present the response of the second chatbot 325B to the user 310A. In some embodiments, the user 310A may not even be aware that a second chatbot 325B has been included in the communication session. Rather, the response may appear as if it was generated by the first chatbot 315C.

Stated another way, a first chatbot 315C can conduct a communication session with a user 310A on a first communication channel or in a first domain. During the communication session, the first chatbot 315C can receive a question or input from the user 310A and determine to request assistance with responding to the question or input from the user 310A. The request for assistance from the first chatbot 315A can comprise the question or user input and can be generated by the first chatbot 315A in response to determining the first chatbot 315A cannot respond with at least a predetermined amount of certainty. In response to determining to request assistance, the first chatbot 315C can send a request for assistance message comprising the question or input from the user to the recommendation servers 330.

The recommendation server can receive the request for assistance from the first chatbot, e.g., and place the request in an event queue 335. A recommendation engine 340 of the recommendation server 330 can select the second chatbot 325B from the available chatbots 315A-315B, 320A-320C, 325A-325C. According to one embodiment, the recommendation engine 340 may select more than one available chatbot 315A, 320C, and 325B, for example. Selecting the second chatbot(s) 315A, 320C, and/or 325B by the recommendation engine 340 can be based on the request specifically identifying the second chatbot. In such a case, the first chatbot 315C can specifically request the second chatbot 325B in the request for assistance based on previous use of one or more responses provided to the first chatbot 315C by the second chatbot 325B. In other cases, selecting the second chatbot(s) 315A, 320C, and/or 325B by the recommendation engine 340 can comprise determining a domain for the question or user input in the request for assistance from the first chatbot 315C and selecting the second chatbot(s) 315A, 320C, and/or 325B from the available chatbots based on a set of records 345 associating or mapping each chatbot 315A-315C, 320A-320C, 325A-325C with one or more domains.

Once the recommendation engine 340 has selected one or more chatbots 315A, 320C, and/or 325B to assist the first chatbot 315C, an orchestrator 345 of the recommendation server 330 can direct the received request for assistance from the first chatbot 315C to the selected second chatbots 315A, 320C, and/or 325B. The second chatbot 325C or each selected chatbot 315A, 320C, and/or 325B can receive the request and send a proposed response. That is, the second chatbot(s) 315A, 320C, and/or 325B can process the question or user input of the request as it usually would and send the generated answer back to the first chatbot 315C in reply to the request for assistance or can directly join the communication session with the user 310A.

The first chatbot 315C can receive, from each responding chatbot 315A, 320C, and/or 325B, the proposed response to the question or input from the user and determine whether to use the proposed response. The determination can be based on a confidence score generated by the respond second chatbot(s) 315A, 320C, and/or 325B and indicated in the provided response. Once the proposed response is selected, the first chatbot 315C can use the proposed response to the question or input received from the second chatbot 325B in the communication session with the user or the second chatbot 325B can directly join the communication session with the user 310A.

A result of using the proposed response to the question or input received from the second chatbot 325B can additionally, or alternatively, be monitored by the first chatbot 315C. A set of information maintained by the first chatbot and related to the second chatbot 325B, e.g., information identifying a channel and/or domain for the second chatbot 325B and, in some cases, a rating for the second chatbot 325B based on the result of the answers provided, can be updated based on the monitoring. That is, if the answer provided by the second chatbot provided a favorable result, the second chatbot can be identified or associated positively with a domain of the question or user input.

The recommendation engine 340 can monitor the response to the request for assistance generated by the second chatbot(s) 315A, 320C, and/or 325B and any subsequent participation by the second chatbot(s) 315A, 320C, and/or 325B in the communication session with the user 310A. According to one embodiment, the first chatbot 315C can additionally or alternatively provide feedback based on the result of using the response to the request for assistance by the first chatbot 315C in the communication session with the user or participation of the second chatbot(s) 315A, 320C, and/or 325B in the communication session with the user 310A. In such cases, the recommendation engine 340 can receive feedback from the first chatbot 315C. Based on monitoring the results and/or on feedback from the first chatbot 315C, the recommendation engine can update a set of reporting records 350 indicating the performance of each chatbot second chatbot(s) 315A, 320C, and/or 325B relative to a channel and/or domain of the communication session with the user 310A. That is, a set of rating can be developed and maintained indicating the performance of each chatbot 315A-315C, 320A-320C, 325A-325C for each channel and/or domain on which they have been used. These reporting records 350 can then be used to influence future recommendations. For example, a learning or training module 355 of the recommendation server 330 can monitor the reporting records, apply one or more machine learning processes based on the monitored results, and adjust the mapping records 345 used by the recommendation engine 340 when selecting chatbots to recommend for a given channel and/or domain.

Figure 4:
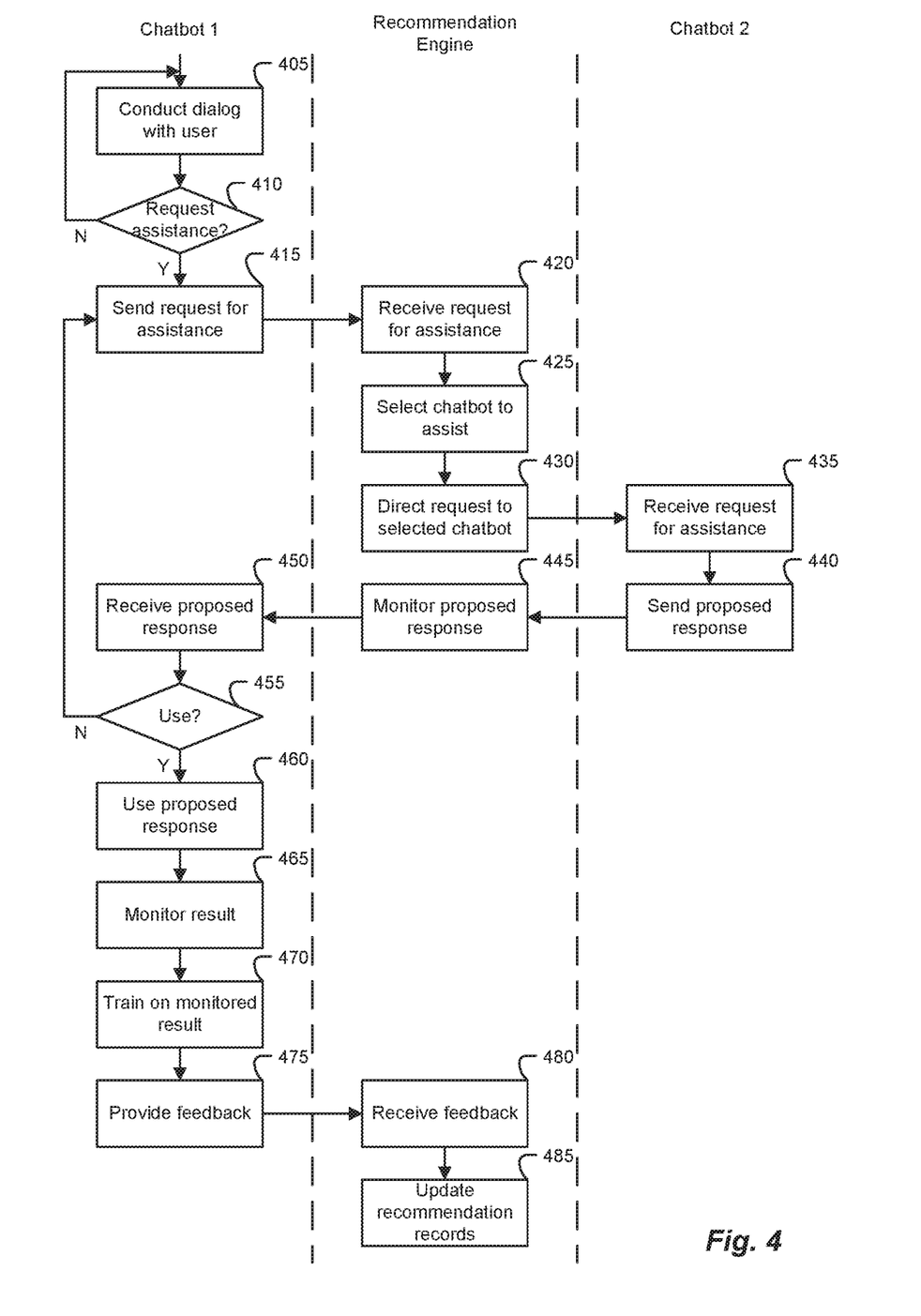
FIG. 4 is a flowchart illustrating an exemplary process for utilizing multiple chatbots on different communication channels and/or across multiple domains to support a communication session on one channel and/or in one domain according to one embodiment of the present disclosure.

FIG. 4 is a flowchart illustrating an exemplary process for utilizing multiple chatbots on different communication channels and/or across multiple domains to support a communication session on one channel and/or in one domain according to one embodiment of the present disclosure. As illustrated in this example, processing can begin with a first chatbot conducting 405 a communication session with a user on a first communication channel or in a first domain. During the session, the chatbot can receive a question or input from the user and determine 410 whether to request assistance with responding to the question or input from the user. Determining 410 whether to request assistance can comprise, for example, determining the first chatbot cannot respond with at least a predetermined amount of certainty. In response to determining 410 to request assistance, the first chatbot can send 415 a request for assistance message comprising the question or input from the user. The request for assistance from the first chatbot can comprise the question or user input.

A recommendation engine executing on a server can receive 420 the request for assistance from the first chatbot and select 425 a second chatbot from a plurality of chatbots. In some embodiments, more than one chatbot may be selected. Selecting 425 the second chatbot(s) can be based on the request specifically identifying the second chatbot. For example, the first chatbot can specifically request the second chatbot in the request for assistance based on previous use of one or more responses provided to the first chatbot by the second chatbot and after checking a rank of the second chatbot from recommendation engines in one or more domains. Additionally, or alternatively, selecting 425 the second chatbot(s) can comprise determining a domain for the question or user input in the request for assistance from the first chatbot and selecting the second chatbot or more than one chatbots from the plurality of chatbots based on a set of records associating each chatbot of the plurality of chatbots with one or more domains.

In either case, the received request for assistance from the first chatbot can be directed 430 to the selected second chatbot(s). The second chatbot or each selected chatbot can receive 435 the request and send 440 a proposed response. That is, the second chatbot(s) can process the question or user input of the request as it usually would and send the generated answer back to the first chatbot in reply to the request for assistance. According to one embodiment, each response to the request for assistance generated by the second chatbot(s) can comprise an answer to the question or interaction represented in the request for assistance and a confidence score for the answer.

The recommendation engine can monitor 445 the response to the request for assistance generated by the second chatbot(s). The first chatbot can receive 450, from each responding chatbot, the proposed response to the question or input from the user and determine whether to use the proposed response or, in the case of more than on proposed response, determine which proposed response to use. In either case, the determination can be based on a confidence score generated by the respond second chatbot(s) and indicated in the provided response. Once the proposed response is selected, the first chatbot can use 455 the proposed response to the question or input received from the second chatbot in the communication session with the user. A result of using the proposed response to the question or input received from the second chatbot in the communication session with the user can be monitored 465 by the first chatbot and a set of information maintained by the first chatbot and related to the second chatbot can be updated 470 based on the monitoring 465. That is, if the answer provided by the second chatbot provided a favorable result, the second chatbot can be identified or associated positively with a domain of the question or user input.

According to one embodiment, the first chatbot can additionally or alternatively provide 475 feedback based on the result of using the response to the request for assistance by the first chatbot in the communication session with the user. In such cases, monitoring the response to the request for assistance generated by the second chatbot can comprise, for example, receiving 480 feedback from the first chatbot. The feedback can be based on a result for using the response to the request for assistance by the first chatbot in the communication session with the user. In such cases, monitoring the response to the request for assistance generated by the second chatbot can further comprise updating 485 the set of records associating each chatbot of the plurality of chatbots with one or more domains.

The present disclosure, in various aspects, embodiments, and/or configurations, includes components, methods, processes, systems, and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for using multiple chatbots to support a contact center communication session, the method comprising:
   receiving, by a recommendation engine executing on a server, a request for assistance from a first chatbot conducting the contact center communication session with a user;
   selecting, by the recommendation engine executing on the server, a second chatbot from a plurality of chatbots;
   directing, by the recommendation engine executing on the server, the received request for assistance from the first chatbot to the selected second chatbot;
   monitoring, by the recommendation engine executing on the server, a response to the received request for assistance generated by the selected second chatbot and sent to the first chatbot by the second chatbot; and
   receiving by the recommendation engine executing on the server, feedback from the first chatbot, the feedback based on a result of using the response generated by the selected second chatbot, wherein the feedback is used to facilitate automated training of other chatbots of the plurality of chatbots.

2. The method of claim 1, wherein the received request for assistance from the first chatbot comprises a question or user input to which the first chatbot cannot respond with at least a predetermined amount of certainty.

3. The method of claim 2, wherein the response to the request for assistance generated by the selected second chatbot comprises an answer to the question or user input and a confidence score for the answer.

4. The method of claim 1, wherein selecting the second chatbot is based on the received request for assistance specifically identifying the second chatbot, and wherein the first chatbot specifically requests the second chatbot in the request for assistance based on previous use of one or more responses provided to the first chatbot by the second chatbot and after checking a rank of the second chatbot from the recommendation engine.

5. The method of claim 1, wherein selecting the second chatbot comprises selecting the second chatbot from the plurality of chatbots based on a set of records for each chatbot of the plurality of chatbots.

6. The method of claim 1, further comprising:
   wherein monitoring the response to the received request for assistance generated by the second chatbot further comprises updating, by the recommendation engine executing on the server, a set of records for the selected second chatbot.

7. A method for conducting a contact center communication session with a user, the method comprising:
   receiving, by a first chatbot conducting the communication session with the user, a question or input from the user;
   determining, by the first chatbot, to request assistance from a second chatbot of a plurality of chatbots with responding to the question or input from the user, wherein determining to request assistance is based on a certainty for a response to the question or input from the user generated by the first chatbot being less than a predetermined amount;
   in response to determining to request assistance from the second chatbot, sending a request for assistance message to a recommendation engine executing on a server, the request for assistance message comprising the question or input from the user;
   receiving, by the first chatbot, from the second chatbot, a proposed response to the question or input from the user;

using, by the first chatbot, the proposed response received from the second chatbot in the communication session with the user; and providing, by the first chatbot, feedback to the recommendation engine, the feedback based on a result of using the proposed response, wherein the feedback is used to facilitate automated training of other chatbots of the plurality of chatbots.

8. The method of claim 7, further comprising:

updating, by the first chatbot, a set of information maintained by the first chatbot and related to the second chatbot.

9. A system comprising:

a first chatbot comprising a processor and a memory coupled with and readable by the processor and storing therein a set of instructions which, when executed by the processor, causes the processor to conduct a communication session with a user, receive a question or input from the user during the communication session, determine to request assistance with responding to the question or input from the user, and in response to determining to request assistance, sending a request for assistance message comprising the question or input from the user; and a server comprising a processor and a memory coupled with and readable by the processor and storing therein a set of instructions which, when executed by the processor, causes the processor to receive the request for assistance message from the first chatbot, select a second chatbot from a plurality of chatbots, direct the received request for assistance message from the first chatbot to the selected second chatbot, and monitor a response to the request for assistance message generated by the selected second chatbot and sent to the first chatbot by the selected second chatbot, and receive feedback from the first chatbot, the feedback based on a result of using the response to the request for assistance message by the first chatbot in the communication session with the user, and wherein the feedback is used to adjust mapping records used by the server.

10. The system of claim 9, wherein the request for assistance message from the first chatbot comprises the question or user input and is generated by the first chatbot in response to determining the first chatbot cannot respond with at least a predetermined amount of certainty.

11. The system of claim 9, wherein the response to the request for assistance message generated by the second chatbot comprises an answer to the question or input represented in the request for assistance and a confidence score for the answer.

12. The system of claim 9, wherein selecting the second chatbot is based on the request specifically identifying the second chatbot, and wherein the first chatbot specifically requests the second chatbot in the request for assistance message based on previous use of one or more responses provided to the first chatbot by the second chatbot and after checking a rank of the second chatbot from the server.

13. The system of claim 9, wherein selecting the second chatbot comprises selecting the second chatbot from the plurality of chatbots based on a set of records for each chatbot of the plurality of chatbots.

14. The system of claim 9, wherein monitoring the response to the request for assistance generated by the second chatbot further comprises updating a set of records for the second chatbot.

15. The system of claim 9, wherein the set of instructions executed by the processor of the first chatbot further cause the processor to update a set of information maintained by the first chatbot and related to the selected second chatbot.

\* \* \* \* \*

UNITED STATES PATENT AND TRADEMARK OFFICE
CERTIFICATE OF CORRECTION

PATENT NO. : 10,848,443 B2  
APPLICATION NO. : 16/042075  
DATED : November 24, 2020  
INVENTOR(S) : Ahmed Helmy Page 1 of 1

It is certified that error appears in the above-identified patent and that said Letters Patent is hereby corrected as shown below:

In the Claims

At Column 18, Line 32, Claim 15, delete "cause" and insert --causes-- therein.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*